United States Patent [19]
Losdahl et al.

[11] Patent Number: 5,778,649
[45] Date of Patent: Jul. 14, 1998

[54] POWER-DRIVEN HEDGE TRIMMER

[75] Inventors: Claes Losdahl; Stefan Stark, both of Huskvarna; Richard Skogward, Jönköping, all of Sweden

[73] Assignee: Aktiebolaget Electrolux, Stockholm, Sweden

[21] Appl. No.: 712,164

[22] Filed: Sep. 11, 1996

[30] Foreign Application Priority Data

Sep. 20, 1995 [SE] Sweden ............... 9503262-9

[51] Int. Cl.⁶ ............... A01D 1/14; A01D 34/08
[52] U.S. Cl. ............... 56/236; 56/DIG. 18; 30/211; 30/514; 30/519
[58] Field of Search ............... 56/236, 239, 233, 56/242, 234, 235, DIG. 18; 16/110 R; 30/519, 502, 503, 503.5, 381, 383

[56] References Cited

U.S. PATENT DOCUMENTS

| | | | |
|---|---|---|---|
| 4,020,555 | 5/1977 | Hedrick | 30/514 X |
| 4,785,540 | 11/1988 | Arvidsson | 30/514 X |
| 5,065,476 | 11/1991 | Dohse et al. | |

FOREIGN PATENT DOCUMENTS

| | | | |
|---|---|---|---|
| 664949 | 8/1995 | European Pat. Off. | |
| 3902700 | 8/1990 | Germany | |
| 4302676 | 8/1994 | Germany | 30/520 |
| 95/09072 | 4/1995 | WIPO | |

Primary Examiner—Terry Lee Melius
Attorney, Agent, or Firm—Pearne, Gordon, McCoy & Granger LLP

[57] ABSTRACT

A power-driven hedge trimmer includes an engine housing (10) which is attached to a base (11) having a cutting tool (12) and a front handle (13) at one end and a rear handle (14) including a gas control (17) at its other end. The rear handle is rotatable relative to the base to enable adjustment to different operating positions. The axis of rotation of the rear handle is inclined at an angle of about 25° relative to the longitudinal axis of the cutting tool (12). The rear handle can be latched in three predetermined operating positions by a latch device (19, 21, 22, 24). The gas control is connected to a rotatable pawl (19) cooperating with the latch device in order to prevent releasing thereof during actuation of the gas control and to prevent actuation of the gas control during adjustment of the rear handle.

9 Claims, 6 Drawing Sheets

POWER-DRIVEN HEDGE TRIMMER

BACKGROUND OF THE INVENTION

The present invention relates to a power-driven hedge trimmer comprising an engine housing which is attached to a base having a cutting tool and a front handle at one end and a rear handle including a gas control at its other end, said rear handle being rotatable relative to the base to enable adjustment to different operating positions.

In order to enable a hedge trimmer to be conveniently used in various operating positions, generally comprising trimming of vertical and horizontal faces of a hedge or the like, it is necessary that the rear handle is readily adjustable between various angular positions. The adjustment should be made in a safe way and to this end adjustment should be possible only when the cutting tool is inactive. Furthermore, the handle should be latched safely in the adjusted position so as to prevent unintentional rotation thereof.

SUMMARY OF THE INVENTION

The object of the invention is to provide a hedge trimmer by which the above requirements and desires have been fulfilled. This has been obtained by means of a hedge trimmer of the kind mentioned in the introduction, which according to the invention is characterized in that the rear handle is rotatable around an axis inclined at an angle relative to the longitudinal axis of the cutting tool and has a latch device for latching the handle in at least two predetermined operating positions.

BRIEF DESCRIPTION OF THE DRAWINGS

The invention will be described in more detail in the following with reference to the accompanying drawings, in which.

DETAILED DESCRIPTION OF THE PREFERRED EMBODIMENT

Figure 1:
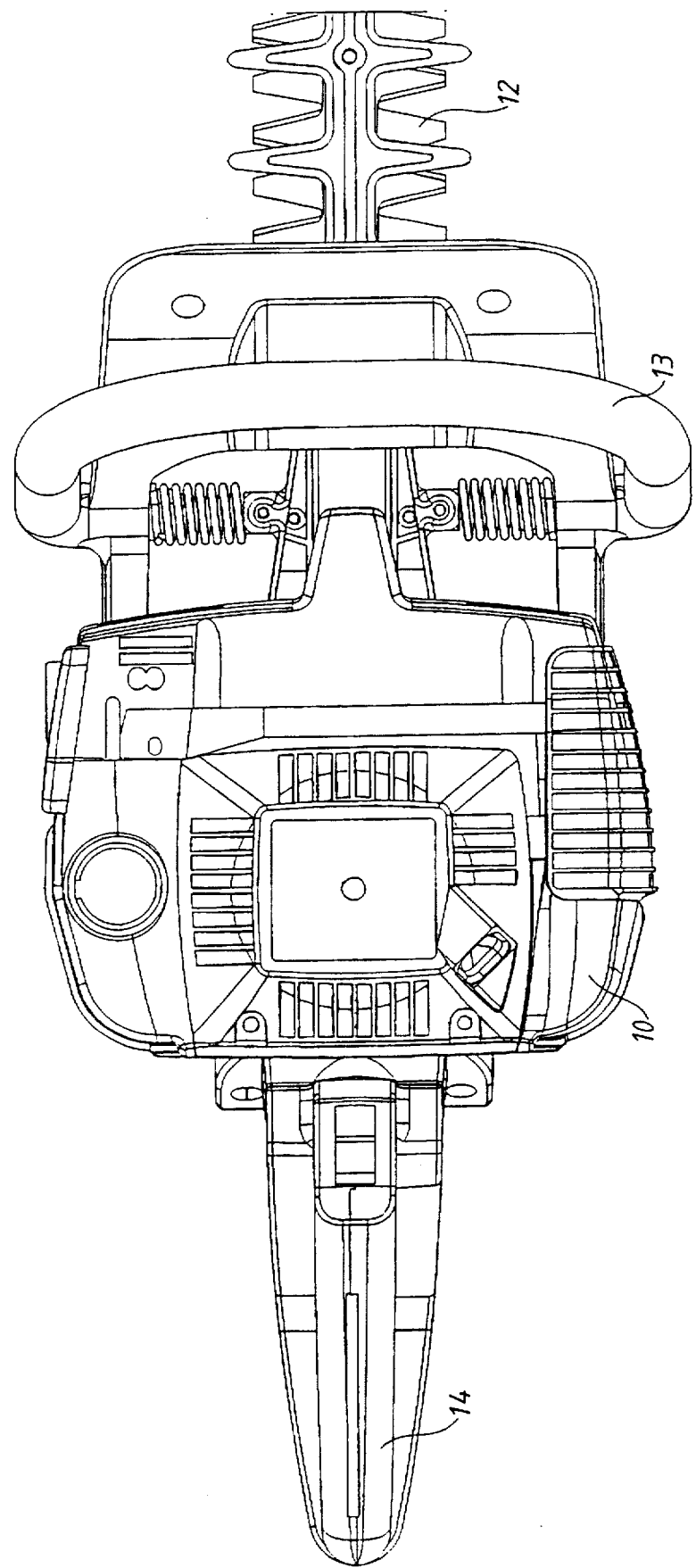
FIG. 1 is a top plan view of the hedge trimmer according to the invention.
Figure 2:
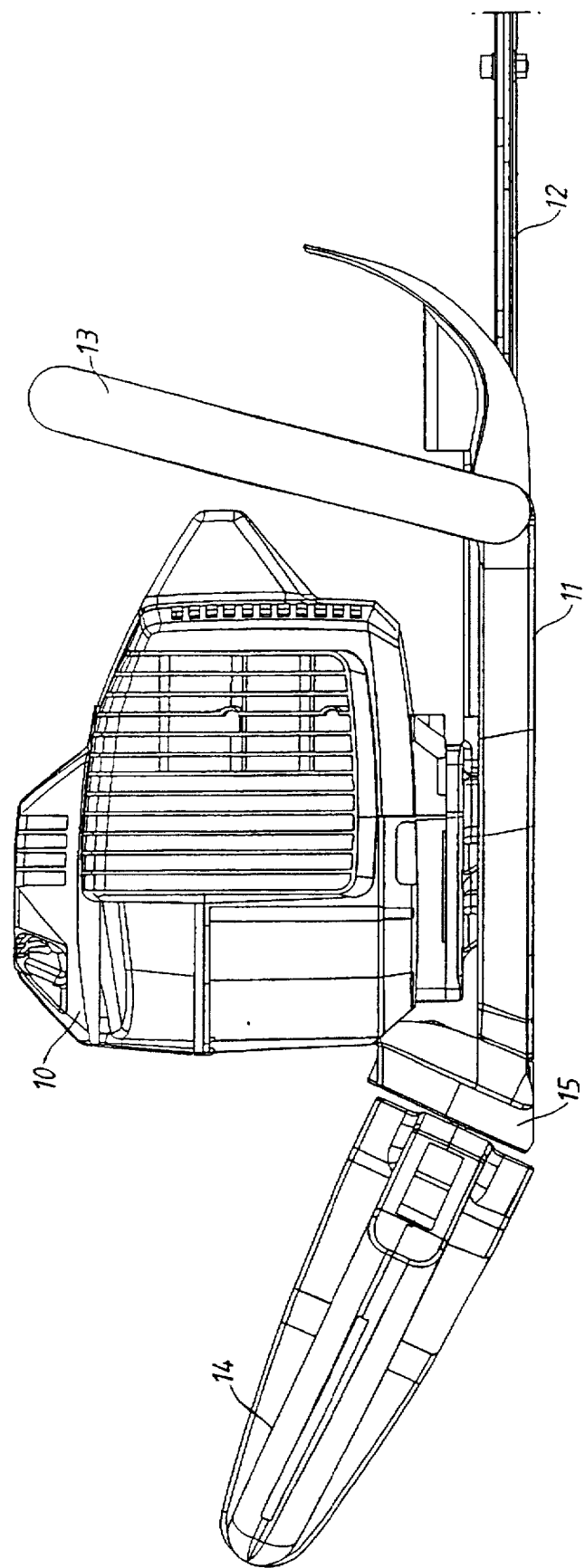
FIG. 2 is a side elevation of the hedge trimmer shown in FIG. 1, FIGS. 3–5 illustrate longitudinal sections of the rear handle in various positions and on a larger scale.

The hedge trimmer shown in FIGS. 1 and 2 comprises an engine housing 10 attached to a base 11 having a cutting tool 12 and a front handle 13 at one end and a rear handle 14 at its other end. The handle 14 is rotatably journalled in a bracket 15 attached to the base 11. In FIG. 1, the handle is shown in a position for trimming horizontal faces. In FIG. 2, the handle has been adjusted 90° to a position for trimming vertical faces.

As is best seen in FIG. 2, the handle 14 is rotatable around an axis inclined by an angle of about 25° relative to the longitudinal axis of the cutting tool 12. This means that a space is provided between the handle and the face being trimmed which makes it possible to trim vertical hedge faces without engagement between the hand holding the handle 14 and the vegetation.

Figure 3:
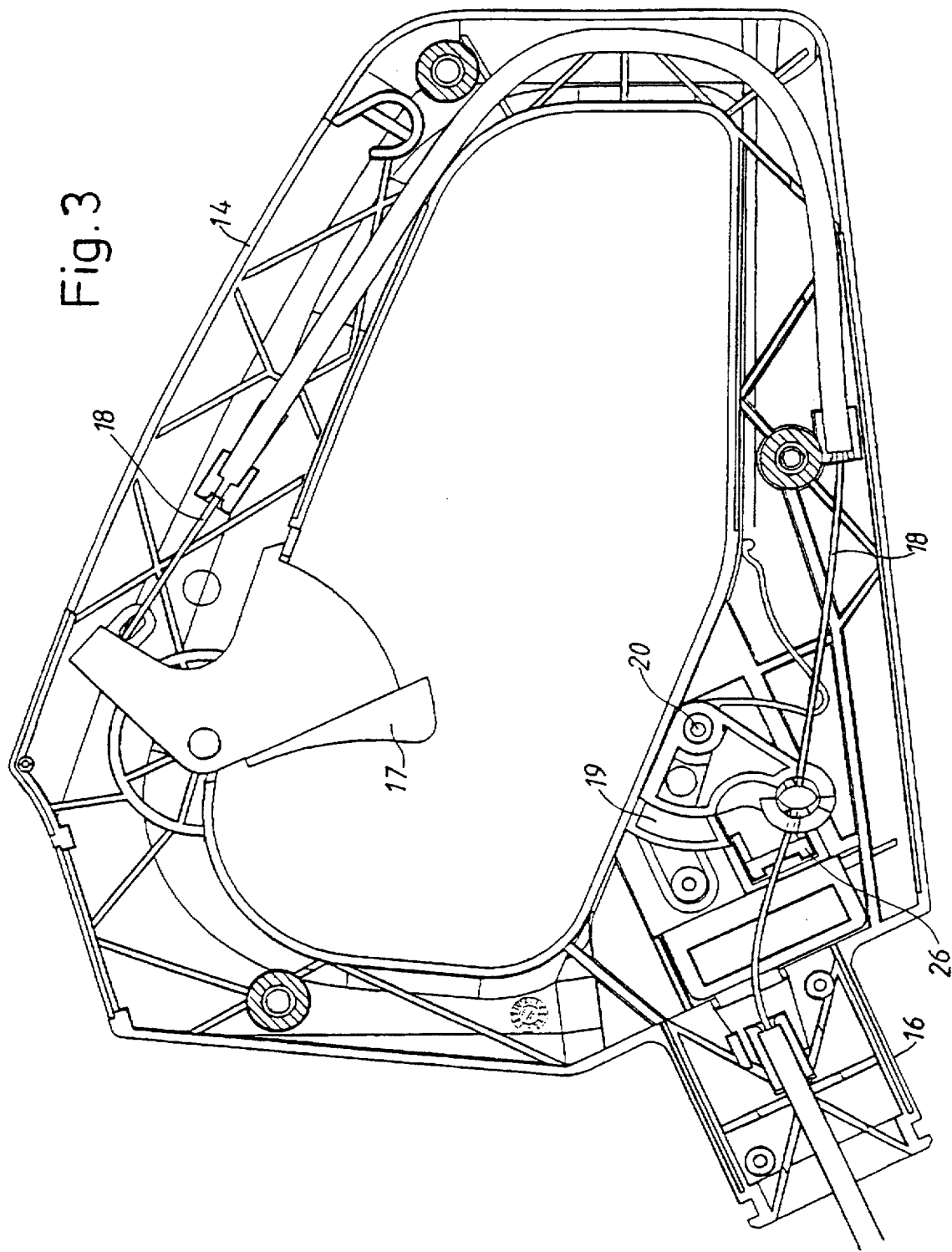
Figure 4:
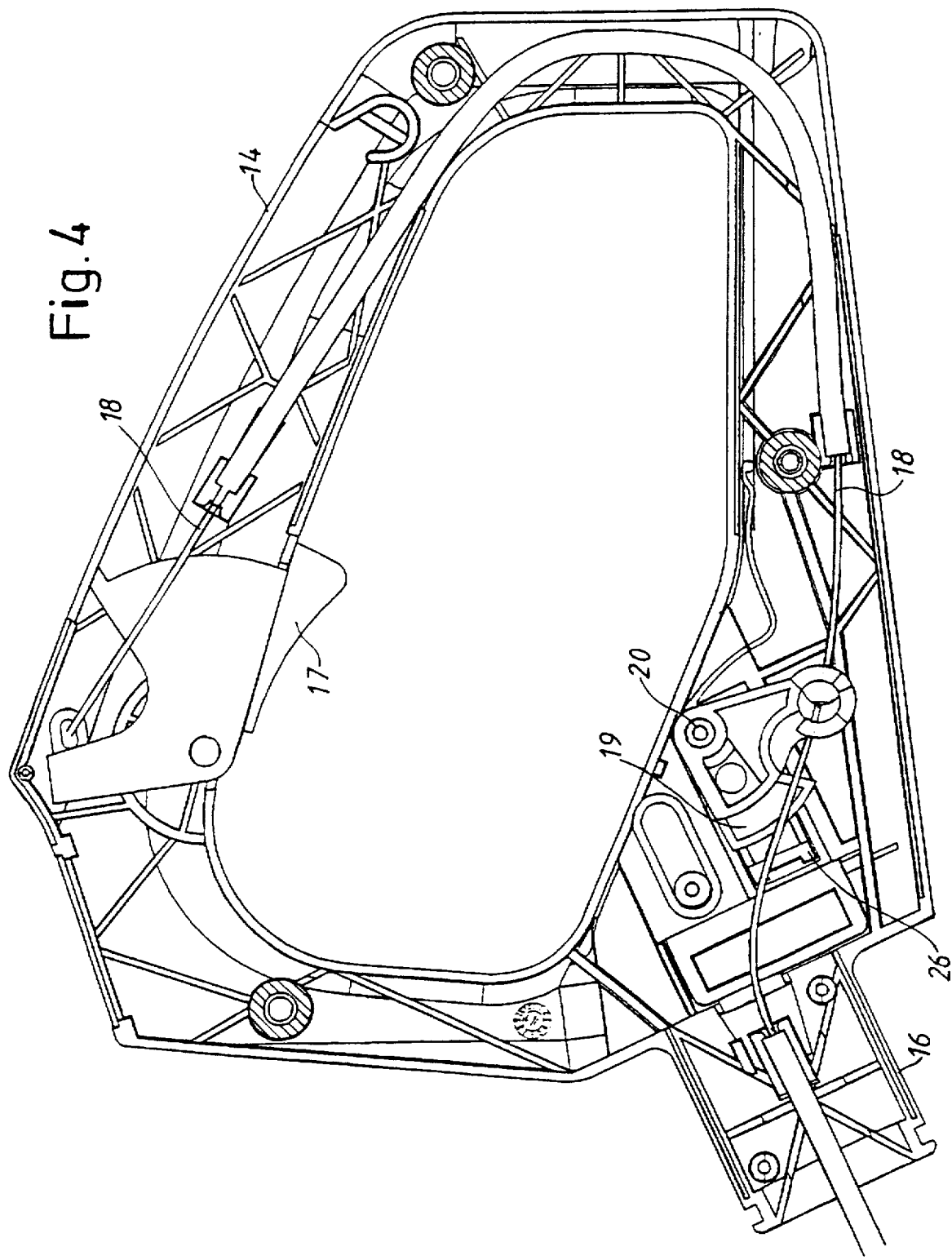
Figure 5:
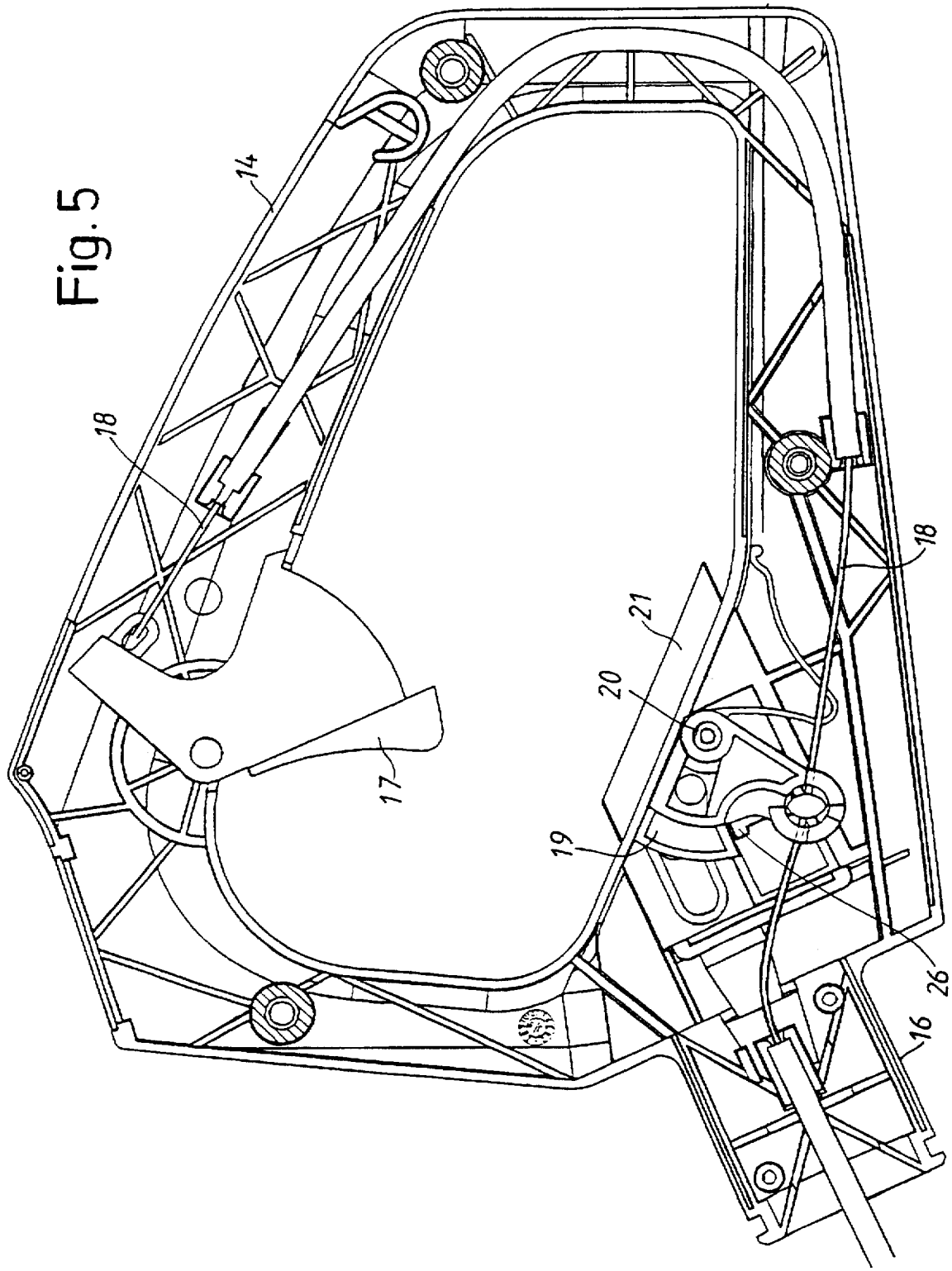

The handle 14 shown in FIGS. 3–5 has a cylindrical tube socket 16 which is rotatably journalled in a complementary opening in the bracket 15. The handle is furthermore provided with a gas control 17 which is connected via a control cable 18 to a carburetor (not shown) in the engine housing 10. The control cable 18 is connected to an angular pawl 19 which is rotatable around a pin 20 at the bottom of the handle.

Figure 6:
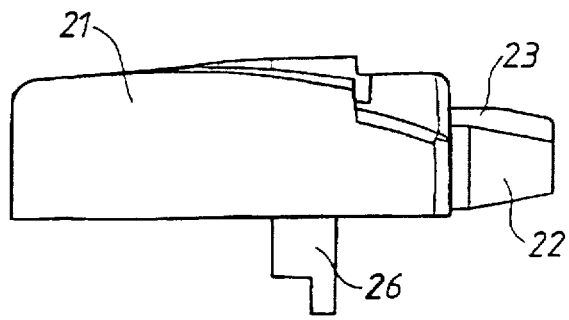
FIGS. 6 and 7 illustrate a side and a front elevation, respectively, of a latch means inherent in said handle.
Figure 7:
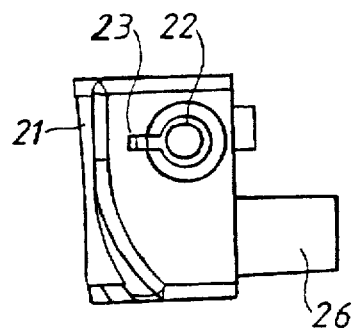
Figure 8:
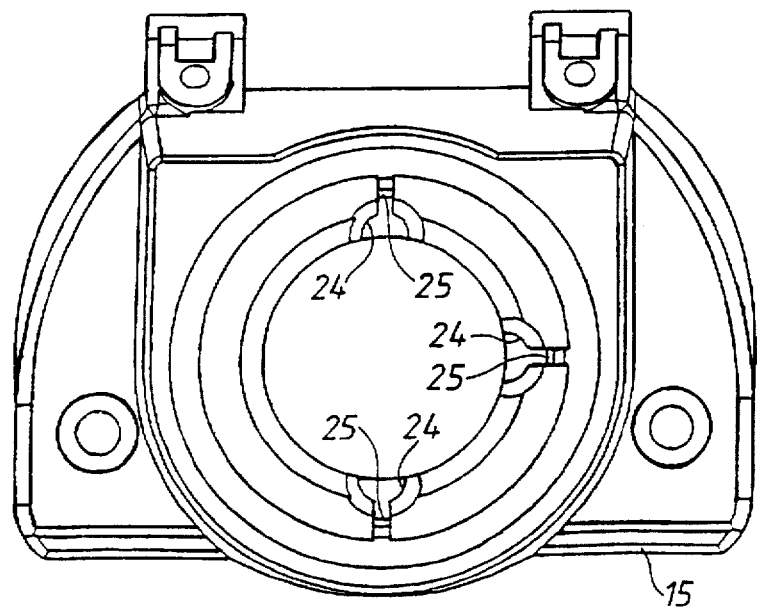
FIG. 8 is an end view of a bracket for the same handle.

A latch handle 21, which is best shown in FIGS. 6 and 7, is axially slidable in parallel with the tube socket 16. The latch handle 21 is provided with a conical latch pin 22 having a longitudinal ridge 23 engaging in complementary recesses in the tube socket 16 and the bracket 15. Three such recesses 24 are shown in FIG. 8 which are mutually displaced 90° around the opening of the bracket 15. The latch handle 21 is resiliently actuated to cause the latch pin to engage either of the recesses 24 which enables adjustment of the rear handle to three different angular positions. The handle 14 is thereby adjustable between three different operating positions according to the orientation of the actual work surface. Due to the engagement of the ridge 23 in complementary grooves 25 in the bracket 15 a safe latching of the handle 14 in the adjusted position is obtained, whereby unintentional rotation of the handle is prevented.

In FIG. 3, the handle 14 is shown in a normal position in which the gas control 17 is not actuated. In this position the latch handle 21 is movable to enable adjustment of the angular position of the handle 14. In FIG. 4 the gas control is in an actuated position corresponding to the operating position of the hedge trimmer, and the pawl 19 has also been rotated an angle around the pin 20 corresponding to the movement of the gas control. In this position the movement of the latch handle is prevented by the engagement of a protrusion 26 with the front end of the pawl 19. Adjustment of the handle is thereby effectively prevented during operation.

In FIG. 5 the handle 14 is shown in a position in which the latch handle 21 has been pulled out, whereby the conical latch pin 22 has been released from its engagement with the recess 24 of the bracket 15. The handle 14 may consequently be rotated to be adjusted to a new angular position. In the shown position the protrusion 26 of the latch handle engages the pawl 19 so as to latch the gas control 17 in an unactuated position. Actuation of the gas control is thereby prevented which in turn ensures that the cutting tool remains inoperative during adjustment of the handle 14.

Due to the mutually operating latch device simultaneous actuation of the gas control 17 and the latch handle 21 is prevented. Consequently, the handle 14 cannot be adjusted during operation, and the gas control 17 cannot be actuated during adjustment of the handle 14. It should be realized that this results in an essentially improved safety during operation of the hedge trimmer.

We claim:

1. A power driven hedge trimmer comprising an engine housing (10), a base (11), a cutting tool (12), a front handle (13), and a rear handle (14), said engine housing being attached to said base, said front handle and said cutting tool being attached to a first end of said base and said rear handle being attached to a second end of said base, said rear handle being rotatable relative to the base to enable adjustment of said rear handle to different operating positions relative to said engine housing, wherein the rear handle is rotatable around an axis inclined at an angle relative to a longitudinal axis of the cutting tool (12) and has a latch device (19–24) for latching the rear handle in at least two predetermined operating positions relative to said engine housing.

2. Hedge trimmer according to claim 1, wherein the rear handle (14) is latchable in three predetermined operating positions which are angularly displaced 90° mutually.

3. Hedge trimmer according to claim 1 or 2, wherein the axis of rotation of the rear handle (14) is inclined at an angle of 20° to 30° relative to the longitudinal axis of the cutting tool (12).

4. Hedge trimmer according to claim 3, wherein the axis of rotation of the rear handle (14) is inclined at an angle of about 25° relative to the longitudinal axis of the cutting tool (12).

5. Hedge trimmer according to any of claims 1–4, wherein the rear handle includes a cylindrical tube socket (16) which is rotatable in a complementary opening in a bracket (15), said latch device comprising an axially movable latch pin (22) adapted to engage in complementary recesses (24) distributed around said opening.

6. Hedge trimmer according to claim 5, wherein the latch pin (22) is conical and has a radially extending, longitudinal ridge (23) adapted to cooperate with complementary grooves (25) in said recesses (24).

7. Hedge trimmer according to any of claims 1–4, wherein said rear handle includes a gas control (17), a latch pin is attached to a latch handle (21) and the gas control is connected to a rotatable pawl (19), said latch handle cooperates with said pawl so as to prevent release of the latch device when the gas control is actuated, and to prevent actuation of the gas control (17) when the latch device is released for rotation of said rear handle.

8. Hedge trimmer according to claim 5, wherein said rear handle includes a gas control (17), the latch pin is attached to a latch handle (21) and the gas control is connected to a rotatable pawl (19), said latch handle cooperates with said pawl so as to prevent release of the latch device when the gas control is actuated, and to prevent actuation of the gas control (17) when the latch device is released for rotation of said rear handle.

9. Hedge trimmer according to claim 6, wherein said rear handle includes a gas control (17), the latch pin is attached to a latch handle (21) and the gas control is connected to a rotatable pawl (19), said latch handle cooperates with said pawl so as to prevent release of the latch device when the gas control is actuated, and to prevent actuation of the gas control (17) when the latch device is released for rotation of said rear handle.

* * * * *